(12) United States Patent
Mielauskas et al.

(10) Patent No.: US 6,179,308 B1
(45) Date of Patent: Jan. 30, 2001

(54) WHEEL END ASSEMBLY FOR FOUR WHEEL STEER VEHICLE

(75) Inventors: Michael W. Mielauskas, Lake Orion, MI (US); Clarence I. Mitchell, Elkhorn, WI (US); Chandrakant D. Ravani, Rochester Hills, MI (US)

(73) Assignee: General Motors Corporation, Detroit, MI (US)

( * ) Notice: Under 35 U.S.C. 154(b), the term of this patent shall be extended for 0 days.

(21) Appl. No.: 09/498,988

(22) Filed: Feb. 7, 2000

(51) Int. Cl.$^7$ ........................................................ B62D 7/99
(52) U.S. Cl. .................... 280/93.512; 180/252; 180/257; 180/258
(58) Field of Search .................... 180/252–258; 280/93.512

(56) References Cited

U.S. PATENT DOCUMENTS

| | | | |
|---|---|---|---|
| 4,482,025 | * 11/1984 | Ehrlinger et al. | 180/255 |
| 4,708,363 | * 11/1987 | Hata | 280/93.512 |
| 4,722,540 | * 2/1988 | Kozyra et al. | 280/93.512 |
| 5,435,590 | * 7/1995 | Larrson | 280/673 |
| 5,513,874 | * 5/1996 | Mori | 280/93.512 |
| 5,911,425 | * 6/1999 | Hofmann et al. | 280/93.512 |
| 5,941,335 | 8/1999 | Krisher | 180/255 |
| 6,079,512 | * 6/2000 | Krisher | 180/259 |

* cited by examiner

Primary Examiner—Eric Culbreth
Assistant Examiner—L. Lum
(74) Attorney, Agent, or Firm—Laura C. Wideman

(57) ABSTRACT

A wheel end assembly for a steerable rear axle of a four wheel steer motor vehicle chassis comprises a constant velocity joint drivingly interconnected with an axle shaft of the steerable rear axle, along a lateral axis defined by the axle shaft, and a wheel assembly for transmitting driving torque therebetween. A yoke has a main body portion with a central, laterally-extending pass-through for the constant velocity joint and is fixedly mounted to the chassis. The yoke has an upper and a lower ball joint arm which laterally extend towards the wheel assembly, where each ball joint arm has a ball joint passage therethrough. A knuckle for transferring steering rotation to the wheel assembly comprises a flat plate body with a central, lateral opening for the constant velocity joint to pass through and splined upper and lower ball joint pockets. The knuckle is configured to fit within lateral volume defined by the yoke main body and ball joint arms to minimize lateral packaging space needed for the wheel end assembly. Ball joints allow the knuckle to swivel relative to the yoke. An adapter has a central passage for the constant velocity joint to pass through and is fixed to the knuckle flat plate body and the wheel assembly to transmit rotation therebetween.

7 Claims, 4 Drawing Sheets

WHEEL END ASSEMBLY FOR FOUR WHEEL STEER VEHICLE

TECHNICAL FIELD

The invention relates to a wheel end assembly for a four wheel steer motor vehicle.

BACKGROUND OF THE INVENTION

Four wheel steer allows all four wheels of a motor vehicle to contribute to the steerability of the vehicle. At low speeds, the rear wheels turn in the opposite direction of the front wheels to improve maneuverability by minimizing the turn radius. At higher speeds, the rear wheels turn in the same direction as the front wheels to increase vehicle stability. Both situations provide particular advantages for long wheelbase vehicles such as full-size trucks, vans, and sport utility vehicles which could benefit from improved maneuverability and stability.

To accomplish four wheel steer, the vehicle wheel track width may increase to accommodate additional steering components such as knuckles, yokes, and ball joints. Extending the wheel track width increases the overall mass of the vehicle. A further consideration for large vehicles is Federal Motor Vehicle Safety Standard 108 which requires two clearance lights on vehicles over 80 inches wide. Therefore it is desirable to manage the additional lateral packaging space required to accommodate four wheel steer.

SUMMARY OF THE INVENTION

The present invention provides a wheel end assembly which minimizes the additional lateral packaging space required to accommodate four wheel steer in a motor vehicle. In particular, the wheel end assembly includes a constant velocity joint drivingly interconnected with both an axle shaft and a wheel assembly for transmitting driving torque therebetween. The wheel end assembly further includes a fixed U-shaped yoke with a central pass-through for the constant velocity joint. The yoke has an upper and a lower ball joint arm, each having a passage for ball joints. A knuckle for transferring steering rotation to the wheel assembly includes a central opening for the constant velocity joint and upper and lower ball joint pockets to receive part of the ball joints. The ball joints allow the knuckle to swivel relative to the yoke. The knuckle does not extend laterally beyond the lateral space defined by the yoke and yoke ball joint arms. This minimizes the lateral packaging space required to accommodate four wheel steer capability. The knuckle is then mounted to the wheel assembly via an adapter. A steering assembly initiates wheel turning via a tie rod pivotally connected to a steering arm of the knuckle. A parking brake assembly may be supported on the adapter between the knuckle and wheel assembly.

The present invention will aid in managing vehicle wheel track width, and thereby the overall vehicle mass. In addition, it will facilitate reaching the target of a vehicle width less than 80 inches.

DESCRIPTION OF THE PREFERRED EMBODIMENT

Figure 1:
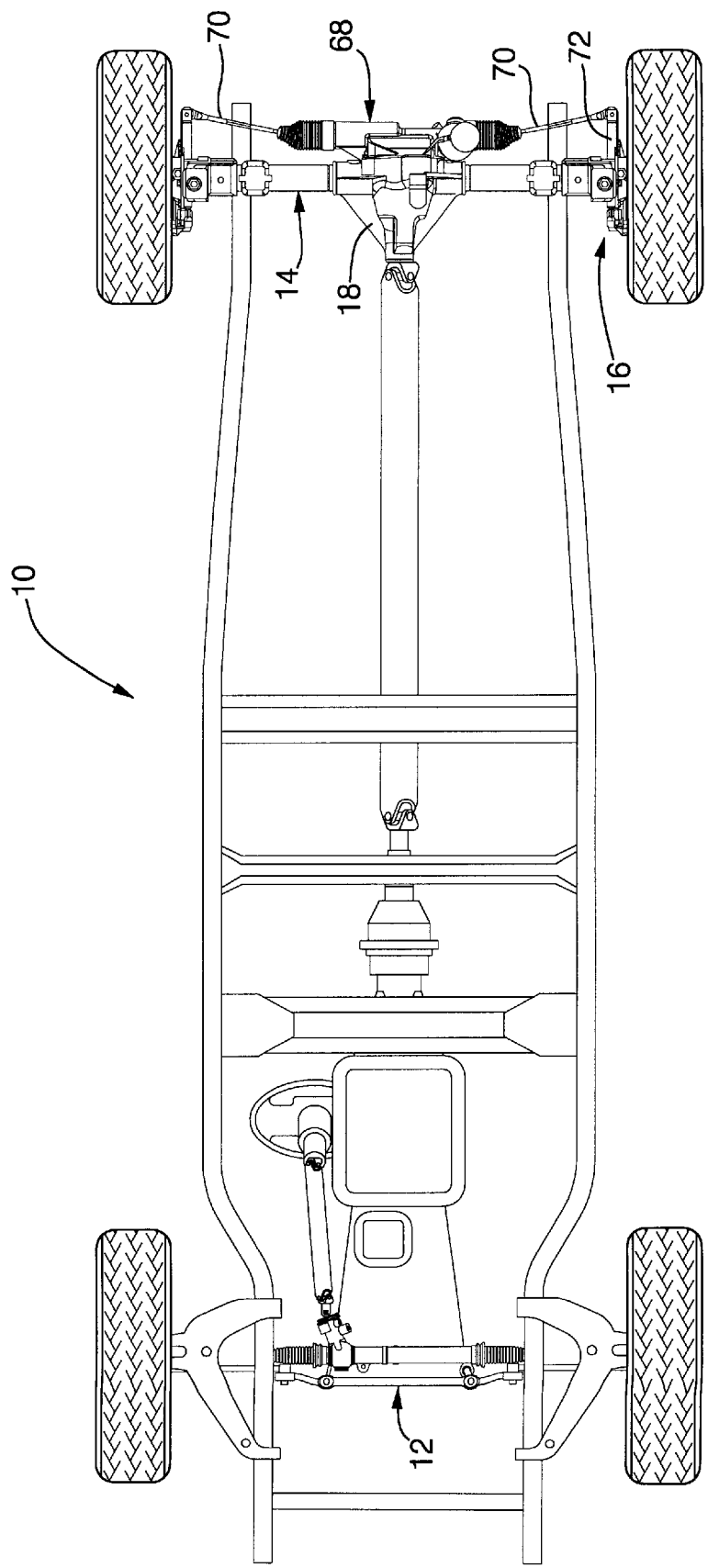
FIG. 1 is a bottom view schematic illustration of a motor vehicle chassis with four wheel steering capability.
Figure 2:
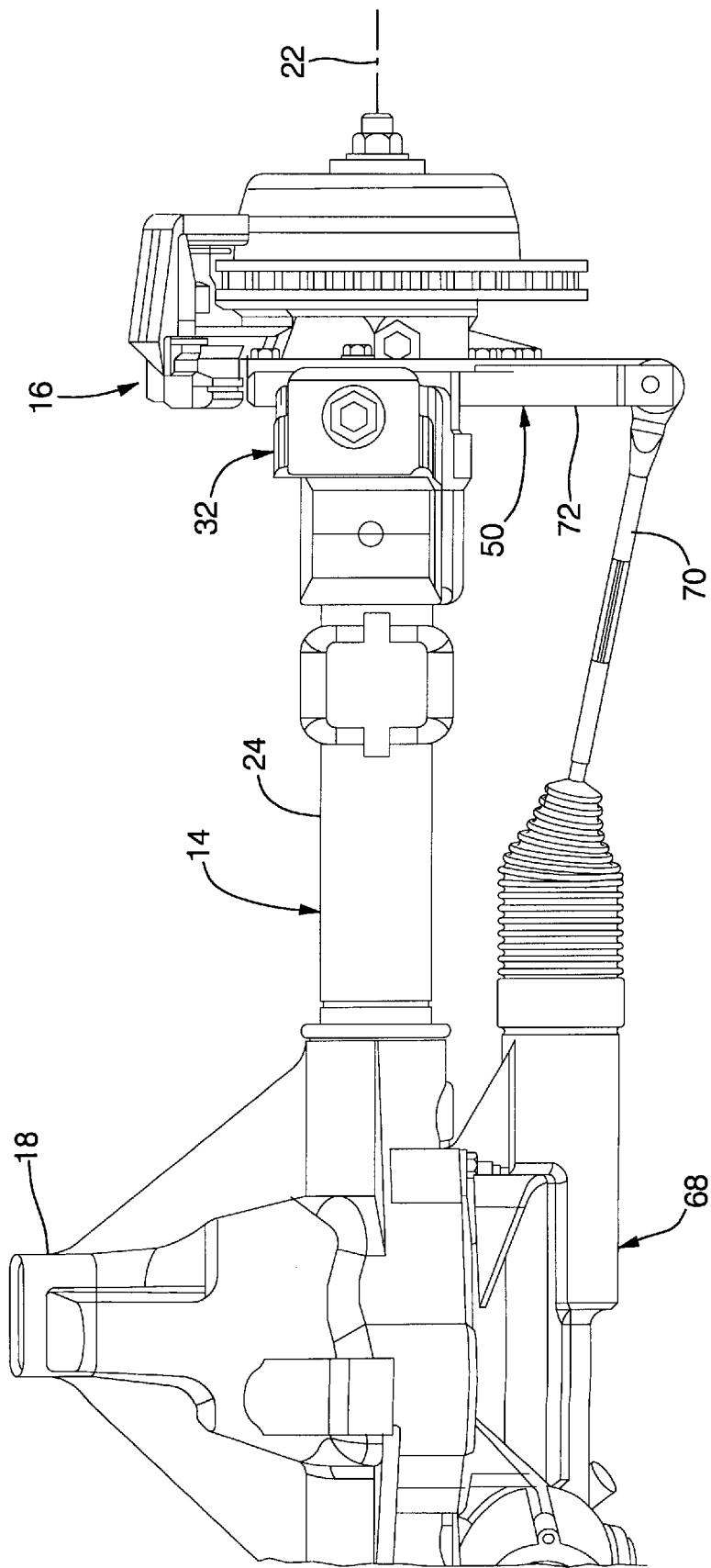
FIG. 2 is a plan view of a wheel end assembly of the present invention with a portion of the vehicle chassis.
Figure 3:
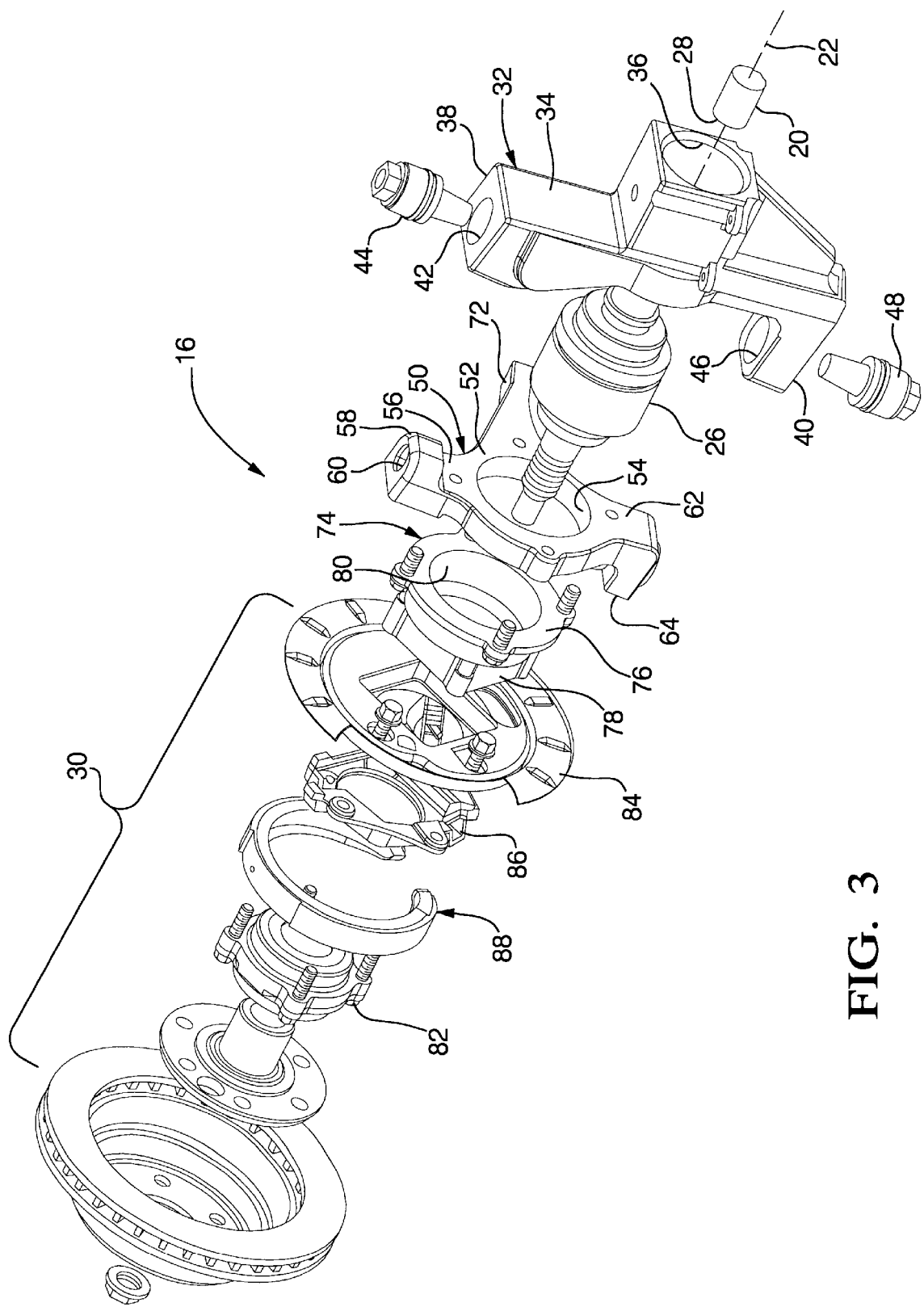
FIG. 3 is an expanded isometric view of the wheel end assembly of the present invention.

FIG. 1 schematically represents a motor vehicle chassis 10 equipped with four wheel steer capability comprised of a steerable front axle 12 and a steerable rear axle 14. A wheel end assembly of the present invention is shown generally as 16. FIGS. 2 and 3 focus with greater particularity on applying the wheel end assembly 16 to the steerable rear axle 14. Generally the rear axle 14 includes a centrally located differential 18 to transfer torque via an axle shaft 20 to drive the wheel end assembly 16. The axle shaft 20 defines a lateral axis 22 and is housed within a fixed axle tube 24.

The wheel end assembly 16 of the present invention as viewed in FIG. 3 includes a constant velocity joint 26 drivingly interconnected to an outboard end 28 of the axle shaft 20 along the lateral axis 22 and to a wheel assembly 30 to transfer driving torque therebetween.

The wheel end assembly 16 also includes a generally U-shaped yoke 32 having a main body portion 34 with a central, laterally-extending pass-through 36 for the constant velocity joint 26. The main body 34 is fixedly mounted to the chassis 10 by welding it to the outboard end of the axle tube 24. The yoke 32 further includes an upper and a lower, laterally-extending ball joint arm, 38 and 40 respectively, which laterally extend towards the wheel assembly 30. The upper ball joint arm 38 has an upper ball joint passage 42 therethrough for housing an upper ball joint 44. Likewise, the lower ball joint arm 40 has a lower ball joint passage 46 therethrough for housing a lower ball joint 48.

To allow for steerability of the rear wheels, the wheel end assembly 16 includes a knuckle 50 for transferring steering rotation to the mounted wheel assembly 30. The knuckle 50 is comprised of a flat plate body 52 with a central, laterally-extending opening 54 for the constant velocity joint 26 to pass through. The knuckle body 52 extends generally in the plane from the upper ball joint 44 to the lower ball joint 48. In the particular knuckle configuration shown, the upper end 56 of the knuckle body 52 includes an inboard-extending arm 58, with a splined upper ball joint pocket 60. Similarly, the lower end 62 of the knuckle body 52 includes an outboard-extending arm 64 with a splined lower ball joint pocket 66 as shown in FIG. 4.

The upper ball joint 44 is housed within the upper ball joint passage 42 of the yoke 32 and the splined upper ball joint pocket 60 of the knuckle 50. It is secured to the yoke 32 by snap rings and interconnected to the knuckle 50 via splines. The lower ball joint 48 is housed within the lower ball joint passage 46 of the yoke 32 and the splined lower ball joint pocket 66 of the knuckle 50. It is secured to the yoke 32 by snap rings and interconnected to the knuckle 50 via splines. This allows the knuckle 50 to swivel relative to the fixed yoke 32.

Figure 4:
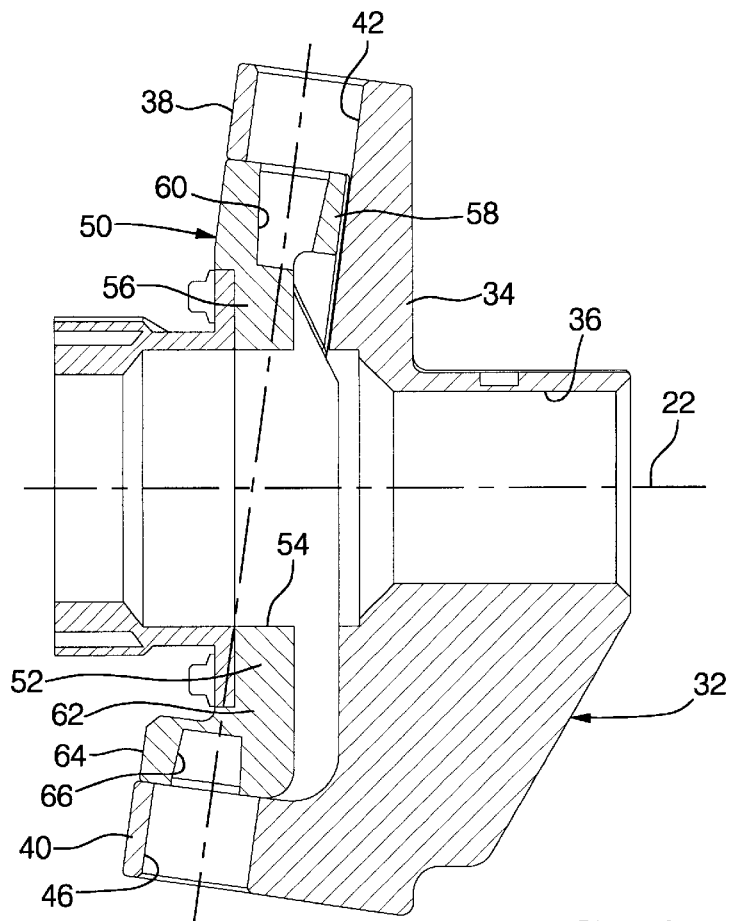
FIG. 4 is a sectional rear view of a portion of the wheel end assembly of the present invention.
Figure 5:
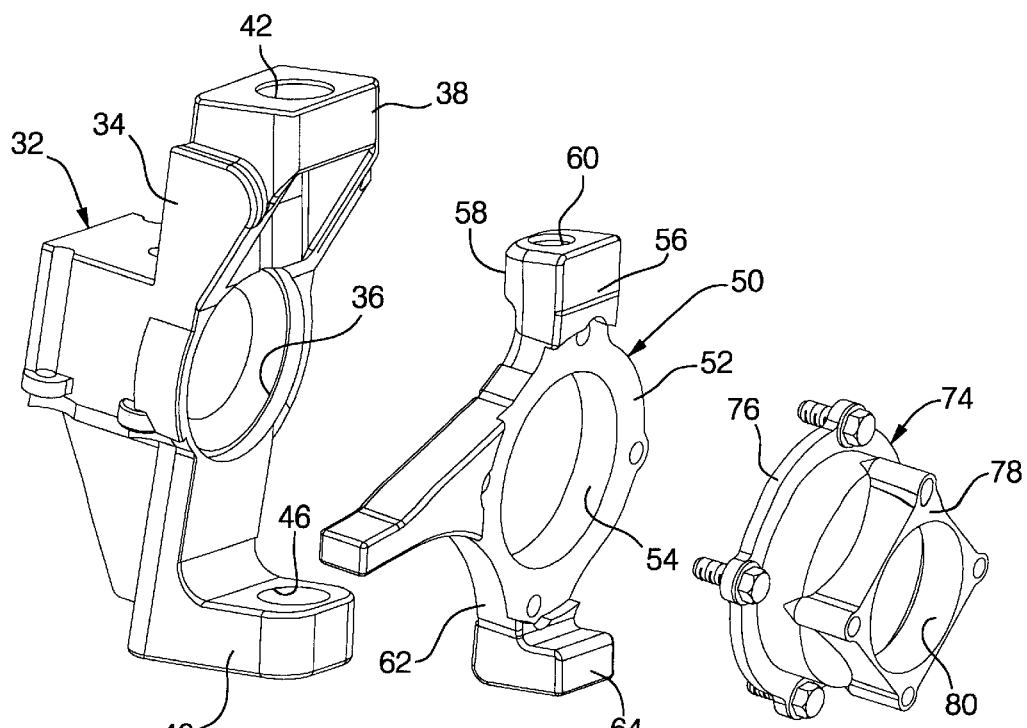
FIG. 5 is an expanded isometric view of the components of FIG. 4.

Although FIGS. 3–5 show a generally Z-shaped knuckle 50, the important factor is that the knuckle is configured to fit within the interior lateral dimension defined by the yoke main body 34 and ball joint arms 38,40 as best shown in FIG. 4. Such a configuration of the knuckle 50 and yoke 32 minimizes the lateral packaging space required for the wheel end assembly 16 and therefore may be used to manage the vehicle wheel track width. The knuckle could also be configured as a generally flat plate body with the upper ball joint pocket at the upper end of the body and the lower ball joint pocket at the lower end, instead of having extending arms for the ball joint pockets. Alternatively the knuckle could be configured in a U-shape with both arms extending outboard, as long as the knuckle packages within the interior lateral space defined by the yoke.

To affect steering of the wheel assembly 30, a steering assembly such as a motor-driven rack and pinion assembly, shown generally as 68 in FIG. 1, mounted behind the differential 18, transversely displaces a steering tie rod 70. The tie rod 70 is pivotally connected to a steering arm 72 of the knuckle 50 to rotate the knuckle.

To transfer the steering input from the knuckle 50 to the wheel assembly 30, an adapter 74 is used to bridge the two. As shown in FIG. 5, the adapter 74 is comprised of a knuckle plate portion 76, on the inboard side, and a wheel plate portion 78, on the outboard side, and has a central passage 80 for the constant velocity joint 26 to pass through. The knuckle plate portion 76 has a bolt pattern to permit fastening to the knuckle body 52. The wheel plate portion 78 extends outboard to secure a wheel bearing assembly 82 of the wheel assembly 30 thereto. A dust shield 84 and backing plate 86 for a park brake assembly 88 may also be secured between the wheel bearing assembly 82 and adapter 74, as illustrated in FIG. 3.

The adapter allows for different brake backing plates to be joined with a particular knuckle without having to redesign either component to make them compatible with each other. Therefore use of an adapter 74 as an intermediary between the knuckle 50 and brake assembly 88 may promote product flexibility.

As an alternative, the adapter 74 could be formed integral with the knuckle 50 to reduce part count and eliminate assembly time needed to fasten a separate adapter to the knuckle. The knuckle 50, in this case, would include the wheel plate portion 78 for securing the wheel assembly 30 thereto.

The wheel end assembly of the present invention has particular applicability for trucks and vehicles with wide wheel tracks due to the compact, lateral packaging space required to accommodate four wheel steer capability. It will aid in maintaining a vehicle width under the targeted 80 inches, as well as managing vehicle mass.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A wheel end assembly for a steerable axle of a motor vehicle chassis, comprising:

a constant velocity joint drivingly interconnected with an axle shaft of the steerable axle, along a lateral axis defined by said axle shaft, and a wheel assembly for transmitting driving torque therebetween;

a yoke having a main body portion with a central, laterally-extending pass-through for said constant velocity joint and fixedly mounted to the vehicle chassis, said yoke further including an upper and a lower, ball joint arm which laterally extend towards said wheel assembly, said upper ball joint arm having an upper ball joint passage therethrough, and said lower ball joint arm having a lower ball joint passage therethrough;

a knuckle fixed to said wheel assembly for transferring steering rotation thereto comprising a flat plate body with a central, lateral opening for said constant velocity joint to pass through, and having a steering arm to affect steering input upon said knuckle, a splined upper ball joint pocket at an upper end, and a splined lower ball joint pocket at a lower end, wherein said flat plate body extends from said upper ball joint passage to said lower ball joint passage of said yoke;

an upper ball joint housed in said upper ball joint passage and said upper splined ball joint pocket and secured to said yoke and splinedly interconnected to said knuckle; and a lower ball joint housed in said lower ball joint passage and said lower splined ball joint pocket and secured to said yoke and splinedly interconnected to said knuckle, wherein said upper and lower ball joints allow said knuckle to swivel relative to said yoke.

2. A wheel end assembly, as defined in claim 1, wherein said knuckle is packaged within lateral space defined by said upper and lower ball joint arms and said main body of said yoke.

3. A wheel end assembly, as defined in claim 2, wherein said yoke is fixedly mounted to an axle tube of the steerable axle.

4. A wheel end assembly for a steerable rear axle of a motor vehicle chassis, comprising:

a constant velocity joint drivingly interconnected with an axle shaft of the steerable rear axle, along a lateral axis defined by said axle shaft, and a wheel assembly for transmitting driving torque therebetween;

a yoke having a main body portion with a central, laterally-extending pass-through for said constant velocity joint and fixedly mounted to said chassis, said yoke further including an upper and a lower, ball joint arm which laterally extend towards said wheel assembly, said upper ball joint arm having an upper ball joint passage therethrough, and said lower ball joint arm having a lower ball joint passage therethrough;

a knuckle for transferring steering rotation to said wheel assembly comprising a flat plate body with a central, lateral opening for said constant velocity joint to pass through, and having a steering arm to affect steering input upon said knuckle, a splined upper ball joint pocket at an upper end, and a splined lower ball joint pocket at a lower end, wherein said flat plate body extends from said upper ball joint passage to said lower ball joint passage of said yoke;

an upper ball joint housed in said upper ball joint passage and said upper splined ball joint pocket and secured to said yoke and splinedly interconnected to said knuckle;

a lower ball joint housed in said lower ball joint passage and said lower splined ball joint pocket and secured to said yoke and splinedly interconnected to said knuckle, wherein said upper and lower ball joints allow said knuckle to swivel relative to said yoke; and an adapter having a central passage for said constant velocity joint to pass through and fixed to said knuckle flat plate body and said wheel assembly to transmit rotation therebetween.

5. A wheel end assembly, as defined in claim 4, wherein said adapter further comprises a knuckle plate portion on an inboard side of said adapter to bolt to said knuckle flat plate body and a wheel plate portion on an outboard side of said adapter to secure a wheel bearing assembly of said wheel assembly and a park brake assembly to said adapter.

6. A wheel end assembly for a steerable rear axle of a four wheel steer motor vehicle chassis, comprising:

- a constant velocity joint drivingly interconnected with an axle shaft of the steerable rear axle, along a lateral axis defined by said axle shaft, and a wheel assembly for transmitting driving torque therebetween;
- a yoke having a main body portion with a central, laterally-extending pass-through for said constant velocity joint and fixedly mounted to said chassis, said yoke further including an upper and a lower, ball joint arm which laterally extend towards said wheel assembly, said upper ball joint arm having an upper ball joint passage therethrough, and said lower ball joint arm having a lower ball joint passage therethrough;
- a knuckle for transferring steering rotation to said wheel assembly comprising a flat plate body with a central, lateral opening for said constant velocity joint to pass through, and having a steering arm to affect steering input upon said knuckle from a tie rod, an inboard-extending arm from an upper end of said body having a splined upper ball joint pocket, and an outboard-extending arm from a lower end of said body having a splined lower ball joint pocket, wherein said knuckle is configured to fit within lateral volume defined by said upper and lower ball joint arms and said main body of said yoke to minimize lateral packaging space needed for said wheel end assembly;
- an upper ball joint housed in said upper ball joint passage and said upper splined ball joint pocket and secured to said yoke and splinedly interconnected to said knuckle;
- a lower ball joint housed in said lower ball joint passage and said lower splined ball joint pocket and secured to said yoke and splinedly interconnected to said knuckle, wherein said upper and lower ball joints allow said knuckle to swivel relative to said yoke; and
- an adapter having a central passage for said constant velocity joint to pass through and fixed to said knuckle flat plate body and said wheel assembly to transmit rotation therebetween.

7. A wheel end assembly, as defined in claim 6, wherein said adapter further comprises a knuckle plate portion on an inboard side of said adapter to bolt to said knuckle flat plate body and a wheel plate portion on an outboard side of said adapter to secure a wheel bearing assembly of said wheel assembly and a park brake assembly to said adapter.

* * * * *